Sept. 26, 1961 R. B. GRONTKOWSKI 3,002,127
OSCILLATOR CONTROLLED FLASHING SIGNAL LAMP CIRCUIT
Filed Oct. 14, 1959 6 Sheets-Sheet 5

INVENTOR.
Raymond B. Grontkowski
BY

ATTORNEY

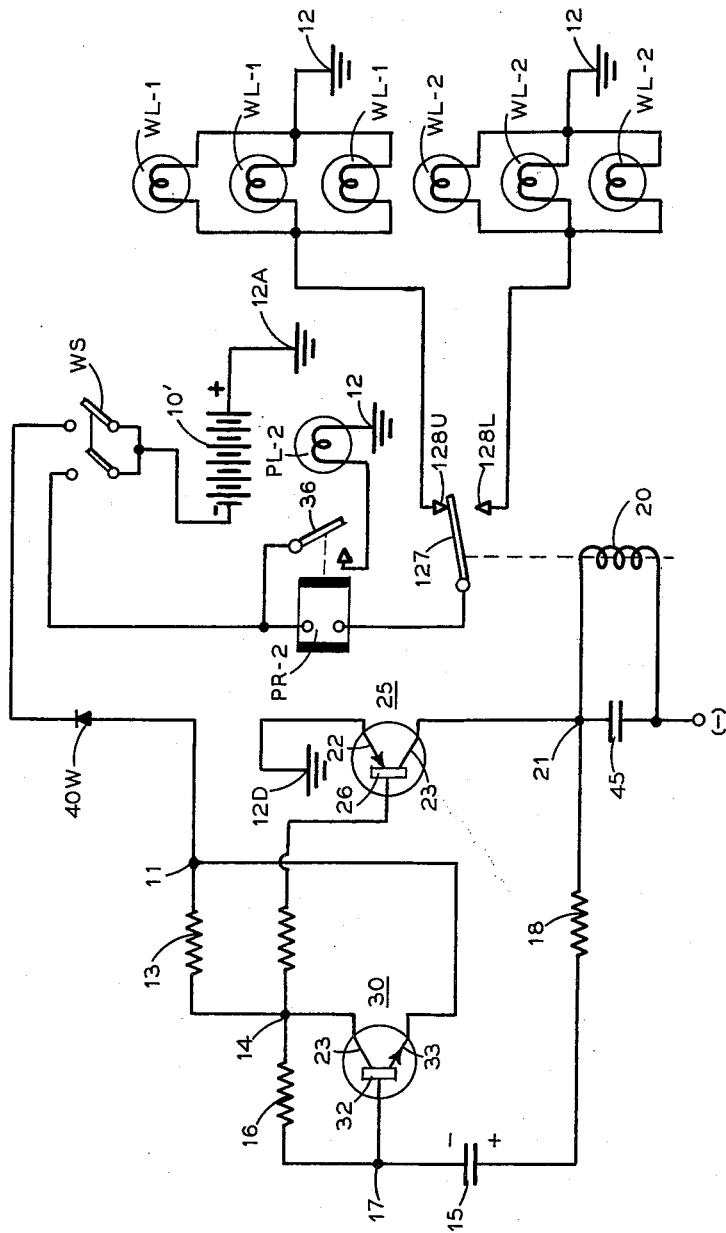

United States Patent Office 3,002,127
Patented Sept. 26, 1961

3,002,127
OSCILLATOR CONTROLLED FLASHING SIGNAL
LAMP CIRCUIT
Raymond B. Grontkowski, Bronx, N.Y., assignor to Signal-Stat Corporation, Brooklyn, N.Y., a corporation of New York
Filed Oct. 14, 1959, Ser. No. 846,374
16 Claims. (Cl. 315—77)

The invention relates to intermittently energized circuits, such as the signal lamp circuits of automotive vehicles, and more particularly to transistorized circuits of this type in which the frequency of cyclic operation is substantially independent of the lamp load and in which the flashing or intermittent energization effect is initiated substantially simultaneously with closing of the circuit rather than after a delay such as is customary with the usual thermostatic flasher type of intermittently energized circuits.

The most commonly used type of intermittently energized electric circuit in automotive vehicles is the turn signal circuit in which turn signal lamps are flashed, following selective operation of a control lever, to indicate a projected turn of the vehicle. Another commonly used type of intermittently energized electric lamp circuit is the warning lamp circuit of emergency vehicles such as school busses, police cars, fire apparatus, ambulances, and the like.

Signalling circuits of the aforementioned types presently incorporate thermo-responsive, electro-mechanical, or magnetic switches or flashers for controlling the intermittent energization of the lamps. However, the arrangements hitherto used have not been satisfactory from the standpoint of performance, reliability, and ready adaptability to any type of vehicle warning light arrangement. One particular difficulty is that of accurately controlling and maintaining the cycling rate or flashing rate at a predetermined value irrespective of the lamp load and of the relative age of the flasher or other switch controlling the intermittent energization. Furthermore, with some signalling arrangements, particularly those which incorporate a thermo-responsive flasher, the failure of one or more signal lamps renders the flasher inoperative to perform its intended function. Also, all of the present arrangements are unduly sensitive to variations in the supply voltage of the vehicle, and the effective supply voltage is frequently dependent upon the lamp load of the controlled circuit. Still another factor is the excessive manufacturing and installation cost involved in obtaining any type of reliability in present intermittently energized signalling circuits for automotive vehicles.

In accordance with the present invention, the foregoing difficulties encountered with present intermittently energized lamp circuit arrangements are obviated by a novel system involving a transistorized oscillator controlling an electro-magnetic relay acting as the alternating on-off switch. The transistorized oscillator has an operating potential applied thereto only when a main control switch for the intermittently energized lamp system is closed. Furthermore, the potential applied to the transistorized oscillator is substantially independent of the lamp load and thereby the rate of operation of the oscillator is not in any manner substantially influenced by the number of lamps connected in the circuit.

A feature of the invention is the use of solid state diodes to assure gating and maintenance of the proper polarity potential upon the oscillator at all times. A further feature is the use of a capacitor in shunt with the coil of the relay to suppress the inductive voltage of the coil and prevent it being impressed upon the transistors of the oscillator. This prevents re-triggering of the transistor, which is a condition that would be undesirable as it would interfere with proper timing of the overall circuit.

This capacitor further functions to delay deenergization of the relay coil during contact transfer, retaining the contacts closed and thus suppressing chattering of the relay.

A further feature of the invention is the association of a pair of resistors with the capacitor for completely independent adjustment of the charging and discharging rates of the capacitor, this being effected by proper selection of the value of each resistor or by the use of adjustable resistances. In accordance with the invention, the ratio of the charge and discharge times is so adjusted that, during the "off" time of the incandescent lamps, the filaments thereof will not become completely cold. The variation in the resistance of the lamp load during cyclic operation is thus reduced to a minimum.

For an understanding of the invention principles, reference is made to the following description of typical embodiments thereof as illustrated in the accompanying drawings. In the drawings:

FIG. 6 is a schematic wiring diagram, corresponding to FIG. 2, but illustrating a battery having its positive terminal grounded.

Figure 1:
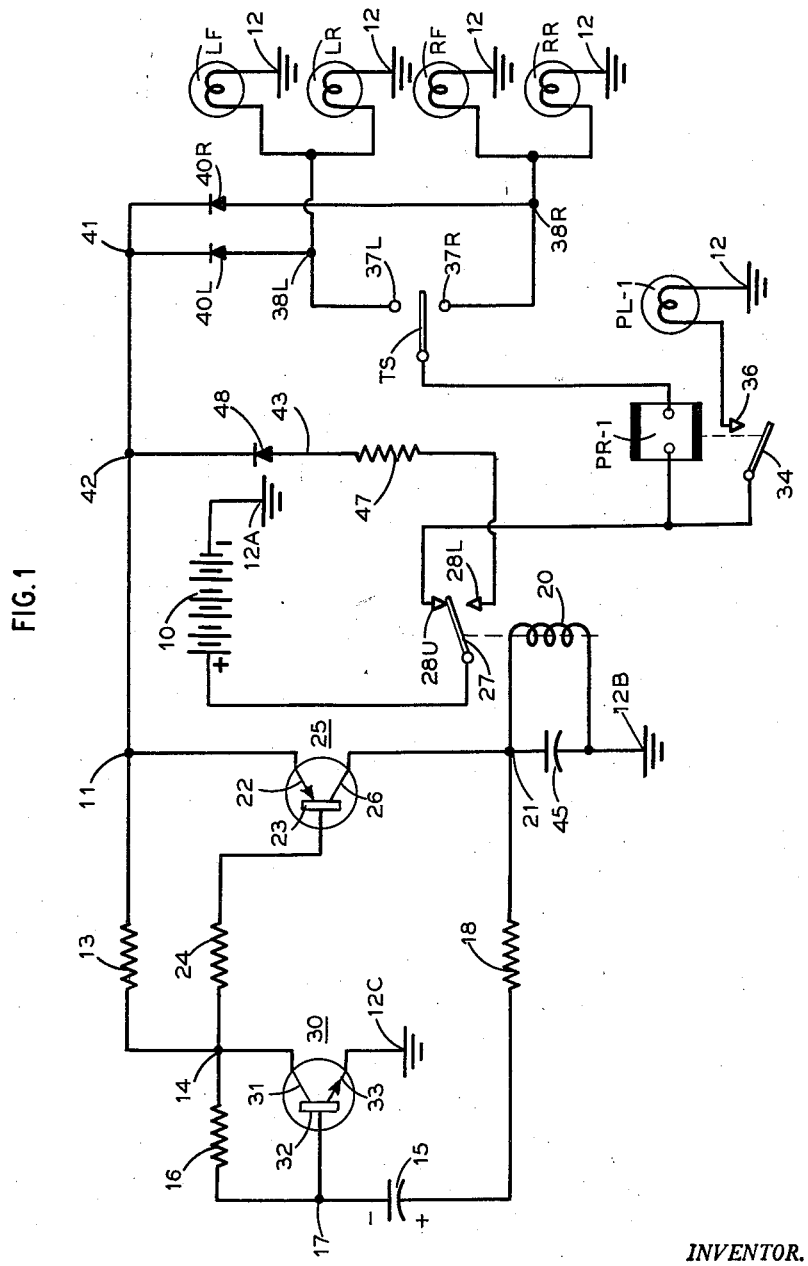
FIG. 1 is a schematic wiring diagram illustrating the application of the invention principles to a turn signalling system for an automotive vehicle provided with a battery having its negative terminal grounded.

Referring to FIG. 1, the automotive turn signalling system therein illustrated incorporates the transistor oscillator circuitry shown and described in my co-pending application Serial No. 810,495, filed May 1, 1959, for "Portable Flasher," the transistor oscillator arrangement being modified in a novel manner for use with the automotive turn signalling system. The source of unidirectional potential for the arrangement is indicated as a six-volt or twelve-volt storage battery 10 of the automotive type, having its negative terminal grounded as at 12A. When this system is operating, the potential of the positive terminal of battery 10 is applied, in a manner to be described, to a junction point 11.

Junction point 11 is one terminal of the transistorized oscillator, and the other terminal thereof is indicated at junction point 21. Junction point 21 has connected thereto the coil 20 of a relay, and the other terminal of coil 20 is grounded, as at 12B, so that point 12B is at the same reference potential, as the negative terminal of battery 10 at point 12A. A capacitor 45 is connected in shunt with coil 20. When positive potential is applied to junction point 11, it is also applied, through a current limiting resistance 13, to a junction point 14. Junction point 14 is connected through a resistance 16 to a junction point 17, and this latter junction point is connected, through a condenser 15, having the normal polarity indicated, and a resistor 18, to junction point 21.

The transistorized oscillator includes a first junction transistor 25 of the PNP type which has its emitter electrode 22 connected to point 11, its base electrode 23 connected through resistor 24 to point 14, and its collector electrode 26 connected to junction point 21.

A second junction transistor 30, of the NPN type, has its collector electrode 31 connected to point 14, its base electrode 32 connected to point 17, and its emitter electrode 33 connected to ground at 12C, which latter point has the reference potential corresponding to that of grounds 12A and 12B.

Transistors such as 25 and 30 are subject to leakage between the collector and base electrodes thereof. Hence, if junction point 14 is at a positive potential, the leakage current between collector electrode 31 and base electrode 32 will result in resistor 16 drawing current from battery 10 through limiting resistor 13. Transistor 30, thus having a potential drop impressed thereacross, becomes conductive so that point 14 becomes relatively negative. When point 14 becomes relatively negative, there is a potential drop across transistor 25 through resistor 24, so that transistor 25 will conduct, completing a circuit including point 11, emitter electrode 22, collector electrode 26, point 21, relay coil 20, and ground 12B. Resistor 24 limits the current between the collector electrode 31 of transistor 30 and the base terminal 23 of transistor 25.

With transistor 25 conducting, its collector electrode 26 becomes relatively positive so that point 21 is also relatively positive. With point 14 relatively negative, capacitor 15 charges in a positive direction so that the negative charges accumulated at point 17 cut off the transistor 30, which thereupon ceases to be conductive. Capacitor 15 discharges through base electrode 32 and emitter electrode 33, of transistor 30, to ground 12C.

With transistor 30 thus blocked by the reverse bias potential of condenser 15, transistor 25 becomes nonconducting and thus blocks current flow through relay coil 20. The cycle then repeats after discharge of condenser 15. The "on" time of the cycle is determined by the values of capacitor 15 and resistor 18, which factors determine the charging rate of condenser 15. The "off" time of the cycle is determined by the values of capacitor 15 and resistor 16, which determine the discharge rate of the capacitor, as the capacitor discharge rate is dependent upon the tendency of transistor 30 to remain conductive by drawing base current through resistor 16.

The cycle of the transistorized oscillator remains operative as long as a positive potential is applied to point 11. The capacitor 45 prevents the fluctuating potential applied to coil 20 from being applied back to transistor 30 and thus re-triggering the latter. Such re-triggering is undesirable as it interferes with proper timing of the transistorized oscillator.

This capacitor further functions to delay deenergization of the relay coil during contact transfer, retaining the contacts closed and thus suppressing chattering of the relay.

The positive terminal of battery 10 is connected to the armature 27 of relay 20. In the de-energized condition of relay coil 20, armature 27 is engaged with contact 28U and, when relay coil 20 is energized, armature 27 transfers to engage contact 28L. Contact 28U is connected, through a pilot relay PR-1 to a turn signal selector switch TS. Pilot relay PR-1 has a normally opened armature 34 which, when the relay is energized, transfers to engage contact 36 to energize pilot lamp PL-1.

Selector switch TS is engageable with either of a pair of contacts 37L or 37R. Contact 37L is connected to grounded left side signal lamps LF and LR, each connected to ground at 12. Contact 37R is connected to the right signal lamps RF and RR each grounded at 12. Contact 37L is also connected to a junction point 38L, and contact 37R is also connected to a junction point 38R. Junction points 38L and 38R are connected through solid state gating diodes 40L and 40R, respectively, to junction point 41 connected to a junction point 42. A conductor 43, having a resistor 47 and a solid state gating diode 48 in series therein, connects junction point 42 to contact 28L of relay 20, and junction point 42 is also connected directly to junction point 11.

The gating diodes 40L and 40R allow positive going potential to be applied to junction point 41, but prevent reverse polarity potential being applied to the contacts 37L and 37R.

When switch TS is closed to engage contact 37L, for example, a positive potential is applied to junction 38L and, through diode 40L, to junction points 41, 42 and 11. Thus, the transistorized oscillator is energized. Also, relay PR-1 is energized to transfer its armature 34 and light pilot lamp PL-1, and the left turn signal lamps LF and LR are also energized.

As explained, the transistorized oscillator immediately becomes effective to permit current flow through relay coil 20. This energizes relay coil 20 so that it transfers armature 27 from contact 28U to contact 28L. This breaks the energizing circuit for the pilot and turn signal lamps. At the same time, however, the positive potential is maintained at junction point 11, conductor 43, resistor 47, diode 48, and junction point 42 so that the transistorized oscillator remains operative. As the condenser 15 discharges, transistor 25 no longer conducts and relay coil 20 is de-energized, causing armature 27 to disengage contact 28L and re-engage contact 28U. This re-lights the signal and pilot lamps on the left side of the vehicle, and positive potential is applied to point 11 through diode 40L and junction points 41 and 42. A fully corresponding action takes places when switch TS is engaged with contact 37R.

Thus the transistorized oscillator alternately opens and closes the energizing circuit for the signal lamps and the pilot lamp relay and its associated pilot lamp. At the same time, positive potential is applied to point 11 both when relay coil 20 is energized and when relay coil 20 is de-energized. As the cycling rate is dependent only upon the constants of the transistorized oscillator, and not upon the lamp load, the cycling is maintained at a uniform rate which remains uniform even if one or more of the signal lamps are inoperative. Of course, there is a slight decrease in the potential applied to point 11 when the armature 27 engages contact 28U due to the small drop through relay PR-1. However, this slight variation in the positive potential is of very minor importance and has no effect on the practical operation of the transistorized oscillator. It will be further noted that pilot lamp PL-1 is flashed in synchronism with the turn signal lamps LF, LR or RF, RR.

Figure 2:
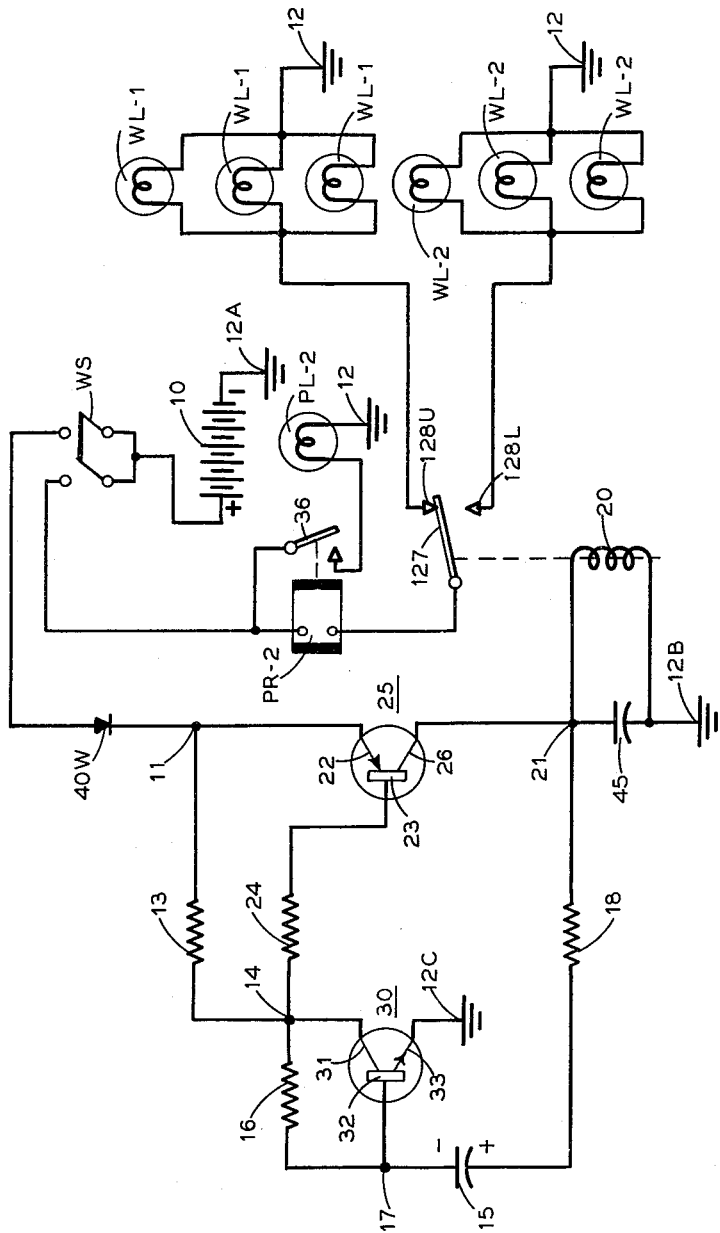
FIG. 2 is a schematic wiring diagram of the invention principles as applied to an alternating warning lamp system for an automotive vehicle having a battery with its negative terminal grounded.

FIG. 2 illustrates an arrangement in which warning lamps WL for an emergency vehicle are arranged in sets which are alternately energized. For example, these warning lamps might be those on a school bus, a fire apparatus, an ambulance, or the like. In the arrangement of FIG. 2, the transistorized oscillator comprising the transistors 25 and 30 is connected in the same manner as previously described between junction points 11 and 21. Relay 20 is connected in parallel with condenser 45 between junction point 21 and ground 12B, the same as in FIG. 1. However, in this case relay 20 has an armature 127 which is normally engaged with an upper contact 128U and, when the relay coil is energized, is transferred to engage a lower contact 128L.

In this case, a double pole, single throw switch WS is connected to the positive terminal of battery 10. One arm of switch WS is connected through a solid state gating diode 40W to junction point 11. Diode 40W allows positive going potential to be applied to point 11, but prevents reversal of the polarity. The other arm of switch WS is connected through a pilot lamp relay PR-2 to armature 127. Pilot lamp relay PR-2 has a normally open armature 36, which when picked up by energization of relay PR-2, closes a circuit through pilot lamp PL-2 grounded as at 12.

It will be noted that one set of warning lamps WL is connected to contact 128U and the other set of warning lamps WL is connected to contact 128L. When switch WS is closed, a positive potential is immediately applied to point 11 through diode 40W so that the transistorized oscillator becomes effective to alternately energize and de-energize coil 20 and thus alternately engage armature 127 with contact 128L or contact 128U. As switch WS is closed, the positive terminal of battery 20 is connected to armature 127 and thus lamps WL-1 are energized through contact 128U. Also, relay PR-2 is energized to pick up its armature 36. The transistorized oscillator immediately energizes coil 20 to transfer armature 127 from contact 128U to contact 128L. This momentarily drops relay PR-2 to flash pilot lamp PL-2, de-energizes lamps WL-1, and energizes lamps WL-2. The transistorized oscillator then de-energizes coil 20 to transfer contact 27 back to the position shown in FIG. 2. This again flashes pilot lamp PL-2 and energizes lamps WL-1 while de-energizing lamps WL-2. The alternate flashing of lamps WL-1 and lamps WL-2 continues as long as switch WS is closed, with the cycling rate being determined entirely by the transistorized oscillator and not being effected in any manner whatsoever by the lamp load. In this case, it will be noted that the potential applied to point 11 remains constant as long as switch WS is closed.

Figure 3:
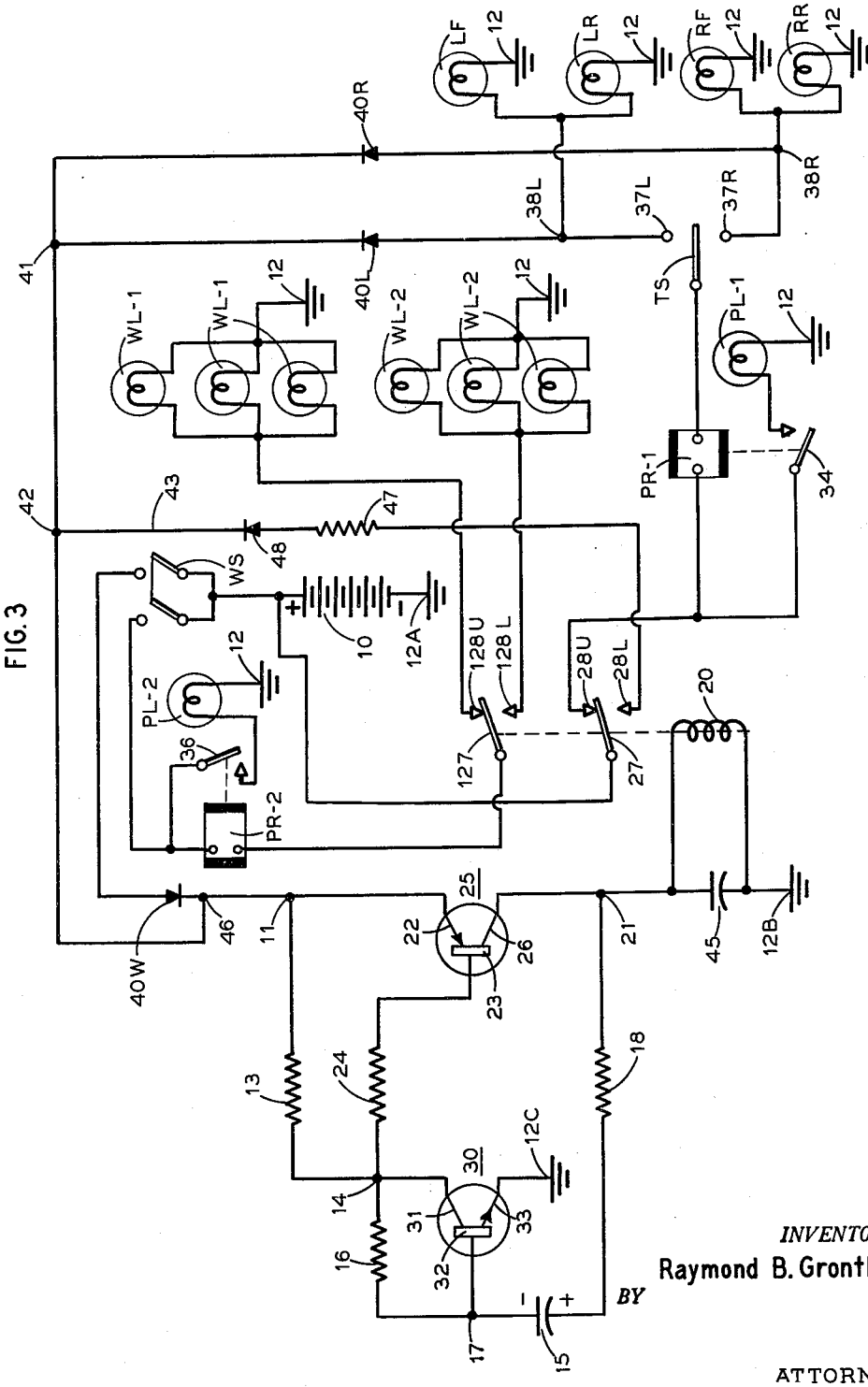
FIG. 3 is a schematic wiring diagram illustrating the arrangements of FIGS. 1 and 2 combined.

FIG. 3 illustrates the arrangement incorporating both the warning lamps, which are alternately energized, and the turn signalling lamps. This circuit of this figure, is, in effect, a combination of the circuits of FIGS. 1 and 2. Except for their connection to the transistorized oscillator, the two intermittently energized lamp circuits are independent of each other. The contact points or junction points 41 and 42 are, in this instance, connected to a junction point 46 which is directly connected to junction point 11 beyond diode 40W. Relay coil 20 operates two armatures, 27 and 127, which engage the same respective contacts as in FIGS. 1 and 2. It will be noted that positive potential is applied to junction point 11 constantly whenever switch WS-1 is closed, and substantially constantly whenever switch TS is engaged with either of its contacts 37L or 37R, and also when both of these switches are closed.

The warning lamps of an emergency vehicle are usually mounted on the roof or sides thereof, so that they are readily distinguished from the turn signal lamps. In the arrangement of FIG. 3, either the warning lamps or the turn signal lamps may be energized, or both may be energized together without interfering with the operation of each other. The cycling rate is common for both sets of lamps, but is independent of the lamp load. As both the warning lamps and the turn signal lamps are provided with their individual pilot lamps PL-2 and PL-1, the operation of the warning and signal lamps is readily determined by observation of either or both pilot lamps.

Figure 4:
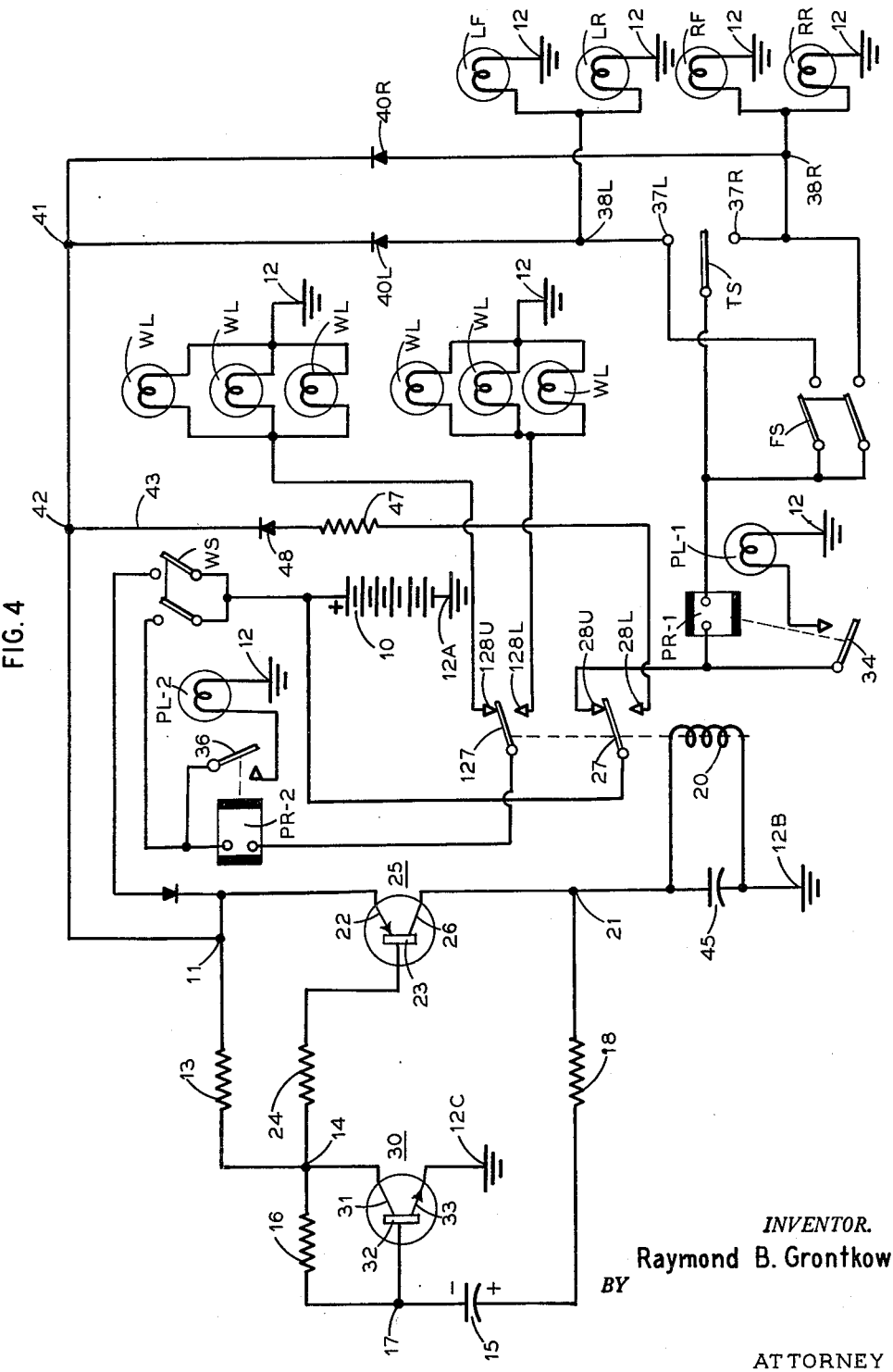
FIG. 4 is a schematic wiring diagram corresponding to FIG. 3 but illustrating the addition of a "flare switch" thereto.

In the circuit of FIG. 4, the general circuitry is exactly the same as in FIG. 3. However, in this case, a double pole single throw "flare signal" switch FS has been added in shunt relation with turn signal switch TS. When flare switch FS is closed, both contacts 37L and 37R are connected in parallel to contact 28U associated with relay armature 27. Thus, in this case, all four signal lamps, or all four sets of signal lamps, are flashed simultaneously when the flare switch FS is closed. Flare switch FS is closed to give an emergency warning signal whenever a vehicle is parked in a dangerous position, as at the side of the road for repairs. It will be noted that the flare switch and the warning lamp switch are independent of each other and may be used together so that all of the vehicle lamps may be flashed at the same time, or all of the signal lamps may be flashed, or all of the warning lamps may be flashed. Also, when flare switch FS is closed, it overrides the turn signal switch TS.

Figure 5:
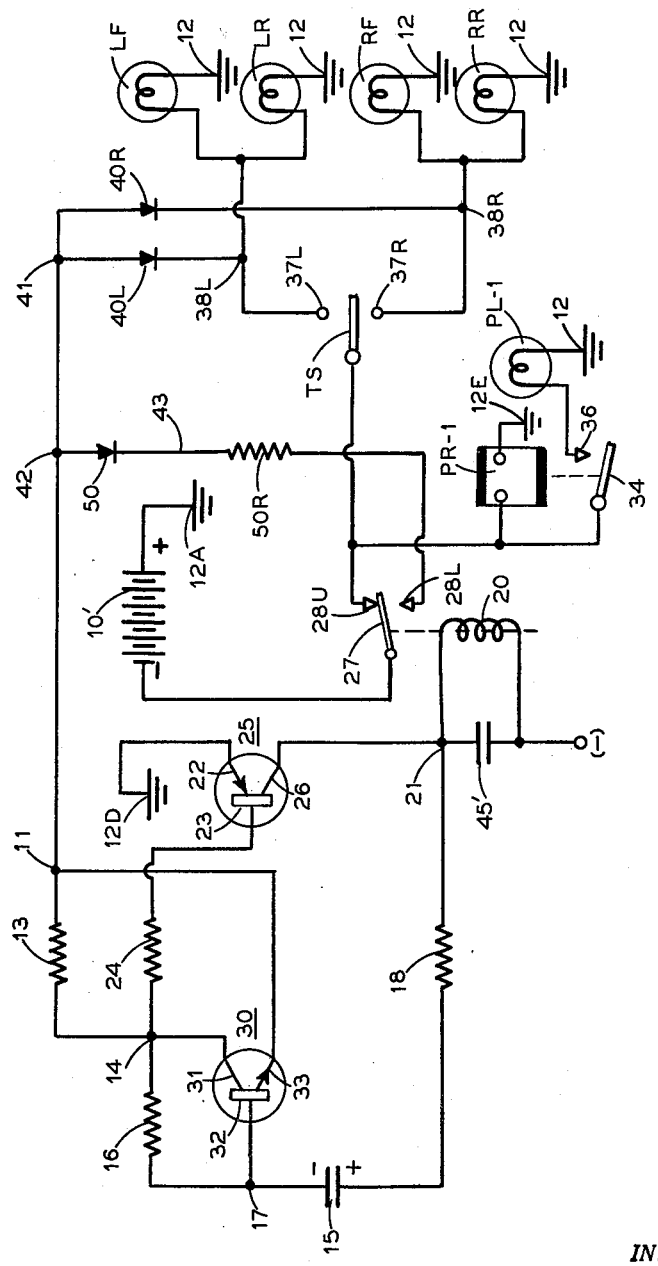
FIG. 5 is a schematic wiring diagram, similar to FIG. 1, illustrating the invention as applied to an automotive turn signalling system wherein the vehicle is equipped with a battery having its positive terminal grounded.

Referring to FIG. 5, the battery 10' has its positive terminal grounded at 12A. Thus, all of the other grounds such as 12, 12D, and 12E are at positive potential. The negative terminal of battery 10' is connected to the armature 27 associated with the relay coil 20 and, in the same manner as in FIGS. 1 through 4, armature 27 is normally engaged with its upper contact 28U which is connected to turn signal switch TS. Thus, if switch TS is engaged with either of its contacts 37L or 37R, the respective junction points 38L or 38R are relatively negative and, through the now conductive associated gating diode 40L or 40R, junctions 41, 42 and 11 are thus at negative polarity. Also, either the left signal lamps or the right signal lamps will be energized dependent upon which contact, 37L or 37R, is engaged by switch TS.

With junction point 11 relatively negative, the forward base to emitter potential of transistor 30 is such that there is a leakage current therethrough. This leakage current results in a current flow through resistor 16, and the resultant potential drop across transistor 30 triggers this transistor conductive so that junction point 14 assumes the negative polarity of junction point 11.

Transistor 25 has its emitter 22 connected to the positive ground at 12D, and its collector 26 is connected to a point of negative polarity through coil 20. With point 14 relatively negative, there is a potential drop across transistor 25 through resistor 24. Transistor 25 thereupon conducts to complete the relay energizing circuit. When coil 20 is energized, armature 27 is transferred to engage contact 28L so that point 42 is connected to the negative polarity through resistor 50R and diode 50.

With transistor 25 conducting, collector electrode 26 becomes relatively positive so that point 21 is also relatively positive. With point 21 relatively positive and point 14 relatively negative, capacitor 15 charges in a direction such that the negative charges accumulated at point 17 cut off transistor 30, and the latter ceases to be conductive. Capacitor 15 then discharges through base electrode 32 and emitter electrode 33. With transistor 30 thus blocked, transistor 25 becomes non-conducting and relay coil 20 is de-energized. The cycle then repeats after the discharge of condenser 15 is completed.

The arrangement shown in FIG. 6 corresponds to that of FIG. 2, modified in the same manner as the arrangement shown in FIG. 5 was modified from that of FIG. 1 to cover the case wherein the positive terminal of battery 10' is grounded. The detailed description of the operation is not believed necessary, as it is adequately covered by the preceding description as well as by the description of FIG. 6.

It will be understood that the arrangements of FIGS. 3 and 4 can also be suitably modified, with reference to FIGS. 5 and 6, to provide for proper operation in the case where the battery 10' has its positive terminal grounded.

The values of resistors 16 and 18 are preferably so selected that the ratio of the charge and discharge times of capacitor 15 result in relay 20 being energized for substantially 50% of each cycle and de-energized for the other 50% of the cycle, with a tolerance of ±10%. Also, the resistance values are so selected that the cycling rate is from 60 to 120 flashes per minute, a rate of 90 flashes per minute being preferred.

At a cycling rate within this range, and with the "on" time and "off" time being substantially equal in each cycle, the filaments of the signal lamps do not become cold during each "off" time, and hence the variation in their resistances is kept at a minimum. This maintains variations in the current through the contacts of relay 20, and variations in the load on battery 10, at a minimum.

As the filaments are thus maintained relatively hot, with a consequent increase in their resistance, the load current is maintained at a relatively low value during cycling of relay 20. With the load current during cycling maintained at a relatively low value during such cycling, the size of the relay and the size of the current carrying contacts can be very substantially reduced. Another advantage of the maintenance of the variation in the current at a minimum is the elimination of migration of contact material and elimination of welding of the contacts due to any heavy surge in the load current. Of course, the initial current surge would still be present but, as the relay contacts are closed durring the initial current surge, and as the load current is effectively reduced before the relay contacts open, due to the heating of the filaments of the signal lamps, this initial current surge is not of any particular moment. As a matter of fact, with the parameters of the present invention, the load current during cycling is only about 10 percent of the initial load current.

A further advantageous feature of the invention resides in the safety features provided by the gating diodes. These diodes, due to their polarizing action, prevent damage to the circuitry in the event any one of the arrangements is connected to battery 10 or 10' with the wrong polarity relations.

While specific embodiments of the invention have been shown and described in detail to illustrate the application of the invention principles, it will be understood that the invention may be embodied otherwise without departing from such principles.

What is claimed is:

1. An intermittently energized signal lamp circuit comprising, in combination, a source of substantially unidirectional electric potential; a lamp load; a relay including an operating coil and an armature movable, upon energization of said coil, from a normal position to a transferred position; a normally open manually operable switch; first circuit means, including said armature in its normal position, effective, immediately upon closure of said switch, to connect said lamp load to said source; a transistorized oscillator in circuit with said relay coil and effective, when connected to a selected polarity terminal of said source, to cyclically intermittently establish current flow from said source through said relay coil to cyclically energize and deenergize the latter to transfer said armature between its two positions; second circuit means effective, during closure of said switch, to connect said oscillator to said selected polarity terminal; and solid state gating diode means included in said second circuit means and polarizing the latter.

2. An intermittently energized signal lamp circuit comprising, in combination, a source of electric potential having a positive terminal and a negative terminal; a lamp load; a relay including an operating coil and an armature movable, upon energization of said coil, from a normal position to a transferred position; a normally open manually operable switch; first circuit means, including armature in its normal position, effective, immediately upon closure of said switch, to connect said lamp load to said source; a transistorized oscillator in circuit with said relay coil and effective, upon application of a positive potential thereto, to cyclically intermittently establish current flow from said source through said relay coil to cyclically energize and deenergize the latter to transfer said armature between its two positions; second circuit means effective, during closure of said switch, to connect said oscillator to the positive terminal of said source; and solid state diode means included in said second circuit means and gating only positive potential to said transistorized oscillator.

3. An intermittently energized signal lamp circuit as claimed in claim 1 including a condenser shunting said relay and suppressing the inductive E.M.F. thereof.

4. An intermittently energized signal lamp circuit as claimed in claim 2 including a condenser shunting said relay coil and suppressing the inductive E.M.F. thereof.

5. An intermittently energized signal lamp circuit comprising, in combination, a source of electric potential having a positive terminal; a lamp load; a relay including an operating coil and an armature movable, upon energization of said coil, from a normal position to a transferred position; a normally open manually operable switch; first circuit means, including said armature in its normal position, effective, immediately upon closure of said switch, to connect said lamp load to said source; a first transistor having an output circuit connected in series between said relay coil and a junction point and operable, when rendered conductive, to connect said relay coil to said junction point; a second transistor connected to said junction point and to said first transistor and effective, upon application of a positive potential to said junction point, to trigger said first transistor to a conductive state; a condenser in circuit with said first and second transistors and charged, during conductivity of said first transistor, to apply a blocking potential to said second transistor and then to discharge through the latter, whereby said second transistor cyclically triggers said transistor between the conductive and non-conductive states to cyclically energize and deenergize said relay coil to transfer said armature between its two positions; second circuit means effective, during closure of said switch, to connect said junction point to the positive terminal of said source; and solid state diode means, included in said second circuit means, and gating only positive potential to said junction point.

6. An intermittently energized signal lamp circuit as claimed in claim 5 in which said switch is connected between said armature and said lamp load and includes a movable switch arm selectively engageable with a fixed contact; said second circuit means comprising a circuit connecting said fixed contact to said junction point and including said diode means.

7. An intermittently energized signal lamp circuit as claimed in claim 5 in which said lamp load comprises right and left signal lamps; said switch is a normally open selector switch having a movable arm engaging with either of a pair of contacts, one connected to the left signal lamps and the other connected to the right signal lamps; and said diode means comprises a pair of solid state diodes each connected in series between one of said contacts and said junction point; said armature being connected in series between said source and said switch arm.

8. An intermittently energized signal lamp circuit as claimed in claim 7 in which said armature, in its transferred position, engages a contact connected to said junction point through a solid state gating diode.

9. An intermittently energized signal lamp circuit as claimed in claim 8 including a condenser connected in shunt with said relay coil to suppress the inductive E.M.F. of the coil and inhibit such inductive E.M.F. being applied to said second transistor.

10. An intermittently energized signal lamp circuit as claimed in claim 5 in which said switch is a double pole switch having its movable arms commonly connected to the positive terminal of said source; said movable arms being engageable with respective fixed contacts; one of said contacts being connected to lamp load through said relay armature, and the other contact being connected to said junction point; said diode means comprising a solid state gating diode in series between said other contact and said junction point.

11. An intermittently energized signal lamp circuit as claimed in claim 10 in which said lamp loads comprises two sets of warning lamps; said armature, in its normal position, connecting one set of lamps to said switch and, in its transferred position, connecting the other set of lamps to said switch; whereby said sets of lamps are energized in alternation.

12. An intermittently energized signal lamp circuit as claimed in claim 11 including a condenser connected in shunt with the relay coil to suppress the inductive E.M.F. of the latter and inhibit application of said inductive E.M.F. to said second transistor.

13. An intermittently energized electric signal lamp circuit as claimed in claim 11 in which said relay includes a second armature movable, in synchronism with said first mentioned armature, between normal and transferred positions; said second armature being connected to the positive terminal of said source; right and left turn signalling lamps; a turn selector switch including a movable arm connected to a contact engaged by said second armature in the normal position of the latter, and a pair of lamp contacts selectively engageable by said movable arm and respectively connected to the left turn signal lamps and to the right turn signal lamps; a pair of solid state gating diodes, each connected in series between one of said lamp contacts and said junction point and in parallel with said first mentioned diode, and each effective to apply only positive potential to said junction point; a conductor connecting the contact engaged by said second armature in the transferred position to said junction point in parallel with said first mentioned diode; a solid state gating diode in said conductor; a first pilot lamp relay having its operating coil connected in series between the normal contact of said second armature and said turn selector switch; said first pilot lamp relay having normally open contacts effective, upon energization of the coil thereof, to connect a pilot lamp to the normal contact of said second armature; a second pilot lamp relay connected in series between said double pole switch and the first mentioned armature and having normally open contacts effective, upon energization of said second pilot lamp relay, to connect a second pilot lamp to said double pole switch; and a second double pole switch having its poles connected in common to the normal contact of said second armature, with the poles respectively engageable with auxiliary contacts each connected to one of said right and left turn signal lamp contacts; said second double pole switch being in parallel with said turn signal selector switch whereby, when closed, to effect flashing of all of said signal lamps simultaneously.

14. An intermittently energized electric signal lamp circuit as claimed in claim 11 in which said relay includes a second armature movable, in synchronism with said first mentioned armature, between normal and transferred positions; said second armature being connected to the positive terminal of said source; right and left turn signalling lamps; a turn selector switch including a movable arm connected to a contact engaged by said second armature in the normal position of the latter, and a pair of lamp contacts selectively engageable by said movable arm and respectively connected to the left turn signal lamps and to the right turn signal lamps; a pair of solid state gating diodes, each connected in series between one of said lamp contacts and said junction point and in parallel with said first mentioned diode, and each effective to apply only positive potential to said junction point; a conductor connecting the contact engaged by said second armature in the transferred position to said junction point in parallel with said first mentioned diode; a solid state gating diode in said conductor; and a second double pole switch having its poles connected in common to the normal contact of said second armature, with the poles respectively engageable with auxiliary contacts each connected to one of said right and left turn signal lamp contacts; said second double pole switch being in parallel with said turn signal selector switch whereby, when closed, to effect flashing of all of said signal lamps simultaneously.

15. An intermittently energized signal lamp circuit comprising, in combination, a source of electric potential; an incandescent signal lamp load; a relay including an operating coil and an armature movable, upon energization of said coil, from a normal position to a transferred position; an electronic oscillator effective, when energized, to alternately energize and de-energize said relay operating coil; a normally open manually operable switch effective, when closed, to establish a series circuit including said source, said lamp load, and said armature in its normal position, and to connect said oscillator to said source for energization by said source; means incorporated in said oscillator effective to adjust the cycling frequency thereof to a value of from 60 to 120 cycles per minute and to proportion the "on" and "off" time of the lamp load during each cycle to a ratio of substantially 1:1; whereby the filaments of said lamp load will not become cold during the "off" time of each cycle so that the variation in filament resistance is kept at a minimum.

16. An intermittently energized signal lamp circuit comprising, in combination, a source of electric potential; an incandescent signal lamp load; a relay including an operating coil and an armature movable, upon energization of said coil, from a normal position to a transferred position; an electronic oscillator effective, when energized, to alternately energize and de-energize said relay operating coil; a normally open manually operable switch effective, when closed, to establish a series circuit including said source, said lamp load, and said armature in its normal position, and to connect said oscillator to said source for energization by said source; means incorporated in said oscillator effective to adjust the cycling frequency thereof and to proportion the "on" and "off" time of the lamp load during each cycle to values such that the filaments of said lamp load will not become cold during the "off" time of each cycle so that the variation in filament resistance is kept at a minimum.

References Cited in the file of this patent

UNITED STATES PATENTS

| | | |
|---|---|---|
| 2,773,220 | Aron | Dec. 4, 1956 |
| 2,829,257 | Root | Apr. 1, 1958 |
| 2,887,592 | Stout | May 19, 1959 |
| 2,891,195 | Smyth | June 16, 1959 |
| 2,916,670 | Pederson | Dec. 8, 1959 |